(12) United States Patent
Shi et al.

(10) Patent No.: US 9,538,455 B2
(45) Date of Patent: Jan. 3, 2017

(54) TECHNIQUES FOR READING SYSTEM INFORMATION IN WIRELESS COMMUNICATIONS

(71) Applicant: QUALCOMM Incorporated, San Diego, CA (US)

(72) Inventors: Yongsheng Shi, San Diego, CA (US); Ansah Ahmed Sheik, Hyderabad (IN); Chetan Chakravarthy, San Diego, CA (US); Liangchi Hsu, San Diego, CA (US); Arvindhan Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 14/475,177

(22) Filed: Sep. 2, 2014

(65) Prior Publication Data
US 2015/0223148 A1   Aug. 6, 2015

Related U.S. Application Data

(60) Provisional application No. 61/935,664, filed on Feb. 4, 2014, provisional application No. 61/936,301, filed on Feb. 5, 2014.

(51) Int. Cl.
*H04W 48/10* (2009.01)
*H04W 48/16* (2009.01)
(Continued)

(52) U.S. Cl.
CPC ............. *H04W 48/10* (2013.01); *H04W 28/18* (2013.01); *H04W 48/16* (2013.01); *H04W 52/0216* (2013.01); *H04W 48/12* (2013.01)

(58) Field of Classification Search
None
See application file for complete search history.

(56) References Cited

U.S. PATENT DOCUMENTS

2006/0039313 A1* 2/2006 Chou .................. H04L 12/5695
                                                                 370/328
2006/0160533 A1* 7/2006 Chou .................. H04L 41/0803
                                                                 455/422.1
(Continued)

FOREIGN PATENT DOCUMENTS

WO   WO-2007/113457 A1   10/2007
WO   WO-2013/183966 A1   12/2013

OTHER PUBLICATIONS

3GPP TS 25.331: "3rd Generation Partnership Project; Technical Specification Group Radio Access Network; Radio Resource Control (RRC); Protocol specification", Release 12, 3GPP Standard, 3rd Generation Partnership Project (3GPP), Mobile Competence Centre; 650, Route Des Lucioles; F-06921 Sophia-Antipolis Cedex; France, vol. RAN WG2, no. V12.0.0, Jan. 6, 2014 (Jan. 6, 2014), pp. 1-2120, XP050729349.

(Continued)

*Primary Examiner* — Kodzovi Acolatse
(74) *Attorney, Agent, or Firm* — Arent Fox LLP

(57) ABSTRACT

Described herein are various aspects related to determining whether to read system information of a network entity. A user equipment (UE) can receive system information transmitted by a network entity. The UE can analyze one or more parameters of the system information to determine whether system information for the network entity has changed when a value tag broadcasted in the system information is equivalent to a stored value tag for the network entity; thus the UE can utilize more than just the value tag, such as system information size, system information scheduling, a value tag in master information, and/or the like, at least in instance where the value tag may be the same in different transmissions of the system information. The UE can process the system information for the network entity based at least in part on determining that the system information for the network entity has changed.

24 Claims, 9 Drawing Sheets

(51) Int. Cl.
   *H04W 28/18*     (2009.01)
   *H04W 52/02*     (2009.01)
   *H04W 48/12*     (2009.01)

(56)             References Cited

U.S. PATENT DOCUMENTS

| | | | | |
|---|---|---|---|---|
| 2007/0287440 | A1* | 12/2007 | Benkert | H04W 24/04 455/422.1 |
| 2009/0197599 | A1* | 8/2009 | Cho | H04W 48/12 455/434 |
| 2009/0253422 | A1* | 10/2009 | Fischer | H04W 48/08 455/418 |
| 2010/0167746 | A1* | 7/2010 | Lee | H04W 48/12 455/450 |
| 2011/0199950 | A1* | 8/2011 | Klingenbrunn | H04W 36/14 370/311 |
| 2012/0052860 | A1* | 3/2012 | Faronius | H04W 68/02 455/426.1 |
| 2013/0109394 | A1* | 5/2013 | Rangaiah | H04W 36/0061 455/437 |

OTHER PUBLICATIONS

International Search Report and Written Opinion—PCT/US2015/013975—ISA/EPO—Jul. 7, 2015. (15 total pages).

* cited by examiner

TECHNIQUES FOR READING SYSTEM INFORMATION IN WIRELESS COMMUNICATIONS

CLAIM OF PRIORITY UNDER 35 U.S.C. §119

The present application for patent claims priority to Provisional Application No. 61/935,664 entitled "APPARATUS AND METHOD FOR READING SYSTEM INFORMATION IN WIRELESS COMMUNICATIONS" filed Feb. 4, 2014, and Provisional Application No. 61/936,301 entitled "APPARATUS AND METHOD FOR READING SYSTEM INFORMATION IN WIRELESS COMMUNICATIONS" filed Feb. 5, 2014, which are assigned to the assignee hereof and hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some systems, the network uses system information to broadcast important information to all UEs in a cell (e.g., information used in requesting network access in the cell), which is typically signaled in system information blocks (SIB) and/or master information blocks (MIB) defined by the access technology. Information that is broadcast in a SIB can change, and a value tag in a SIB is used to indicate change of the SIB to a UE. In particular, a range of values can be used to indicate change of a SIB such that when a broadcasted value tag matches the tag stored in a UE, the UE need not read the broadcasted SIB and instead can use a stored SIB (e.g., or stored information from a prior SIB), which can allow for saving UE power, conserving radio resources, avoiding unnecessary delay in accessing a network, etc. In one specific implementation, in UMTS, SIB5 value tag can have values 1 to 4, which cycle as the SIB5 is modified in the cell. Thus, if a UE returning to the cell encounters a value other than that previously stored by the UE, the UE can receive, process, and store SIB5 from the cell.

It is possible, however, that the network implements certain features, such as dynamic activation/deactivation of high speed random access channel (HS-RACH) and/or high speed forward access channel (HS-FACH), which uses SIB5 modification to indicate the activation/deactivation depending on whether common enhanced data channel (E-DCH)/high speed dedicated shared channel (HS-DSCH) information is included or not. Thus, the SIB5 content can be toggled and/or changed frequently, and 4 value tags may not be sufficient to reliably indicate a change in SIB5. In particular, a UE may leave a cell, and that cell may completely cycle through value tags before the UE returns, in which case the UE may read the same value tag, and thus does not read SIB5 though SIB5 may have changed. This can result in the UE not being able to communicate with the cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of determining whether to read system information of a network entity is provided. The method includes receiving system information transmitted by a network entity, analyzing one or more parameters of the system information to determine whether system information for the network entity has changed when a value tag broadcasted in the system information is equivalent to a stored value tag for the network entity, and processing the system information for the network entity based at least in part on determining that the system information for the network entity has changed.

In another aspect, an apparatus for determining whether to read system information of a network entity is provided. The apparatus includes a system information block (SIB)/master information block (MIB) receiving component configured to receive system information transmitted by a network entity. The apparatus further includes a parameter analyzing component configured to analyze one or more parameters of the system information to determine whether system information for the network entity has changed when a value tag broadcasted in the system information is equivalent to a stored value tag for the network entity, and a SIB processing component configured to process the system information for the network entity based at least in part on determining that the system information for the network entity has changed.

In yet another aspect, an apparatus for determining whether to read system information of a network entity is provided. The apparatus includes means for receiving system information transmitted by a network entity, and means for analyzing one or more parameters of the system information to determine whether system information for the network entity has changed when a value tag broadcasted in the system information is equivalent to a stored value tag for the network entity. The apparatus further includes means for processing the system information for the network entity based at least in part on determining that the system information for the network entity has changed.

In still a further aspect, a method of determining whether to read system information of a network entity is provided. The method includes initializing a re-read timer related to system information received from a network entity, detecting expiration of the re-read timer, and processing additional system information received for the network entity when moving into coverage of the network entity based at least in part on expiration of the re-read timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
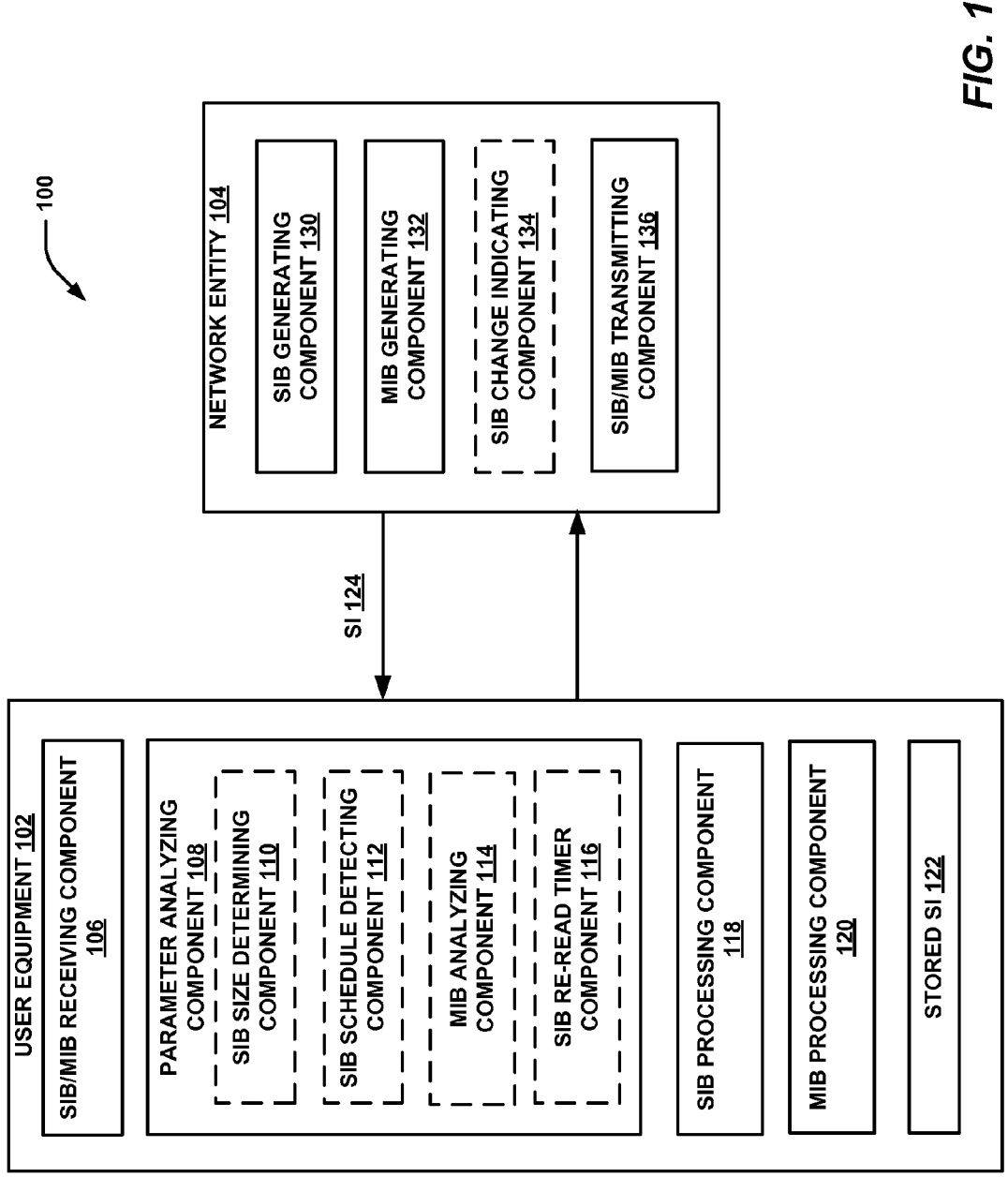
FIG. 1 is a block diagram illustrating an example wireless communications system according to aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, a component may be one of the parts that make up a system, may be hardware or software, and/or may be divided into other components.

Various aspects described herein relate to indicating whether system information in a cell has changed to allow user equipment (UE) to avoid re-reading system information. In one example, a UE or other device reading a system information block (SIB) can determine whether the SIB has changed based on one or more parameters including or not including a related value tag in the SIB. The one or more parameters may include a number of SIB segments included in scheduling information. For example, when additional features become supported or unsupported by a cell, the size of the SIB can increase or decrease, and the UE can determine the SIB has changed when the size of the SIB changes from a previously stored version (or a portion of information) of the SIB. In another example, the network can use a different scheduling of segments of a SIB to indicate the SIB has changed, and the UE can detect the different scheduling used in a transmitted SIB as compared to a stored SIB for the cell to determine whether the SIB has changed. In yet another example, the network can use bits in other system information, such as in a master information block (MIB) or other information read before the SIB, to indicate whether the SIB has changed. In the foregoing examples, it is to be appreciated that the UE may determine whether the SIB has changed in a cell regardless of value tags.

As used herein, the term "network entity" may refer to substantially any node in a wireless network to which a UE can communicate to facilitate receiving wireless network access. For example, a "network entity" may include a radio transceiver apparatus, a Node B, and/or the like, as described further herein. In addition, as used herein, the term "system information" may refer to substantially any information that is broadcast from a network entity to a UE (e.g., in a provided cell) to facilitate accessing one or more services at the cell. For example, "system information" may include one or more MIBs and/or SIBs defined in the standards applicable to one or more network technologies, such as UMTS. Moreover, though SIBs are generically referred to herein, it is to be appreciated that the functionality described herein may be applied to substantially any portion of system information.

FIG. 1 is a schematic diagram illustrating a system 100 for wireless communication, according to an example configuration. FIG. 1 includes a UE 102 that communicates with a network entity 104 in a wireless network. Though one UE 102 and one network entity 104 are shown, it is to be appreciated that multiple UEs 102 can communicate with a network entity 104, a UE 102 can communicate with multiple network entities 104, and/or the like.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), and/or the like. In addition, UE 102 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air communication link using one or more OTA communication protocols described herein. Additionally, in some examples, UE 102 may be configured to facilitate communication on multiple separate networks via multiple separate subscriptions, multiple radio links, and/or the like.

Furthermore, network entity 104 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, network entity 104 may communicate with one or more other network entities of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described herein may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, network entity 104) may be coupled to a core network via one or more wired or wireless connections.

User equipment 102 can include a SIB/MIB receiving component 106 for receiving one or more MIBs and/or SIBs broadcast by network entity 104, and a parameter analyzing component 108 for analyzing one or more parameters of system information to determine whether the one or more SIBs and/or MIBs for network entity 104 have changed relative to one or more previously received SIBs and/or MIBs from network entity 104, such as when UE 102 was previously operating in a cell of network entity 104. Parameter analyzing component 108 can optionally include one or more of a SIB size determining component 110 for obtaining a size of a SIB (e.g., a number of segments, bytes, etc.), a SIB schedule detecting component 112 for determining a scheduling of segments within the SIB, a MIB analyzing component 114 for analyzing one or more values of one or more MIBs received from network entity 104, and/or a SIB re-read timer component 116 for utilizing one or more timers to determine whether to re-read the SIB. UE 102 also includes a SIB processing component 118 for obtaining and reading one or more SIBs received from network entity 104, and a MIB processing component 120 for obtaining and reading one or more MIBs received from network entity 104. Moreover, UE 102 can store received system information (SI) 122 for one or more network entities, such as network entity 104, or related cells to avoid having to receive and process the SI from the network entity (e.g., SI 124) in subsequent communications with the network entity 104 (e.g., in the related cell).

Network entity 104 can include a SIB generating component 130 for creating one or more SIBs including information for communicating with the network entity, a MIB generating component 132 for creating one or more MIBs that can also include information for communicating with the network entity and/or information regarding the SIBs, an optional SIB change indicating component 134 for indicating a change in system information from a previous transmission of system information (e.g. due to additionally supported features), and a SIB/MIB transmitting component 136 for communicating MIBs/SIBs to one or more UEs or other devices in a wireless network.

According to an example, UE 102 communicates with network entity 104 to receive wireless network access, as described, and can receive and process MIB/SIB information from the network entity 104. In this example, the network entity 104 can provide a cell within which the UE 102 can communicate. Thus, SIB generating component 130 can generate one or more SIBs including information for communicating in the cell, MIB generating component 132 can generate one or more MIBs that include information for communicating in the cell and/or SIB information, and SIB/MIB transmitting component 136 can transmit the MIBs/SIBs within the cell. SIB/MIB receiving component 106 can receive the MIBs/SIBs from the cell, MIB processing component 120 can process the one or more MIBs, SIB processing component 118 can process the one or more SIBs, and the UE 102 can utilize information received in the MIBs/SIBs to communicate with network entity in the provided cell.

It is to be appreciated that SIB/MIB receiving component 106 can include a receiver portion of a transceiver (e.g., transceiver 410 in FIG. 4) or substantially any receiver or related processor configured to receive wireless signals over a transmission medium (e.g., radio frequency (RF) resources). Similarly, SIB/MIB transmitting component 136 can include a transmitter portion of a transceiver (e.g., transceiver 410 in FIG. 4) or substantially any transmitter or related processor configured to transmit wireless signals over the transmission medium.

As described, however, the UE 102 can store SIB information for network entity 104 such that the UE 102 need not re-read/process the SIB information when re-entering the cell, or otherwise attempting access to a wireless network from the cell, if the SIB information has not changed. Aside from, or in addition to, using value tags, as described above, the UE 102 can utilize one or more other parameters specified by the network entity 104 to determine whether the SIB information has changed, as further described in reference to FIGS. 2 and 3 below. For example, the UE 102 can read one or more MIBs when re-entering coverage of network entity 104 and/or one or more other SIBs to determine information regarding a given SIB. This can occur in all cases of re-entering coverage of the network entity 104 or only in cases where UE 102 determines that the value tag stored for the network entity 104 is the same as that read for the network entity 104 (e.g., read in a MIB and/or SIB, which may indicate the value tag has cycled). In either case, if the SIB information has changed, SIB processing component 118 can read and process the SIB from network entity 104, which can include storing the SIB information for subsequent comparison as well. In another example described in reference to FIG. 4, the UE 102 can re-read a given SIB when a timer related to a SIB and the network entity 104 expires.

Figure 2:
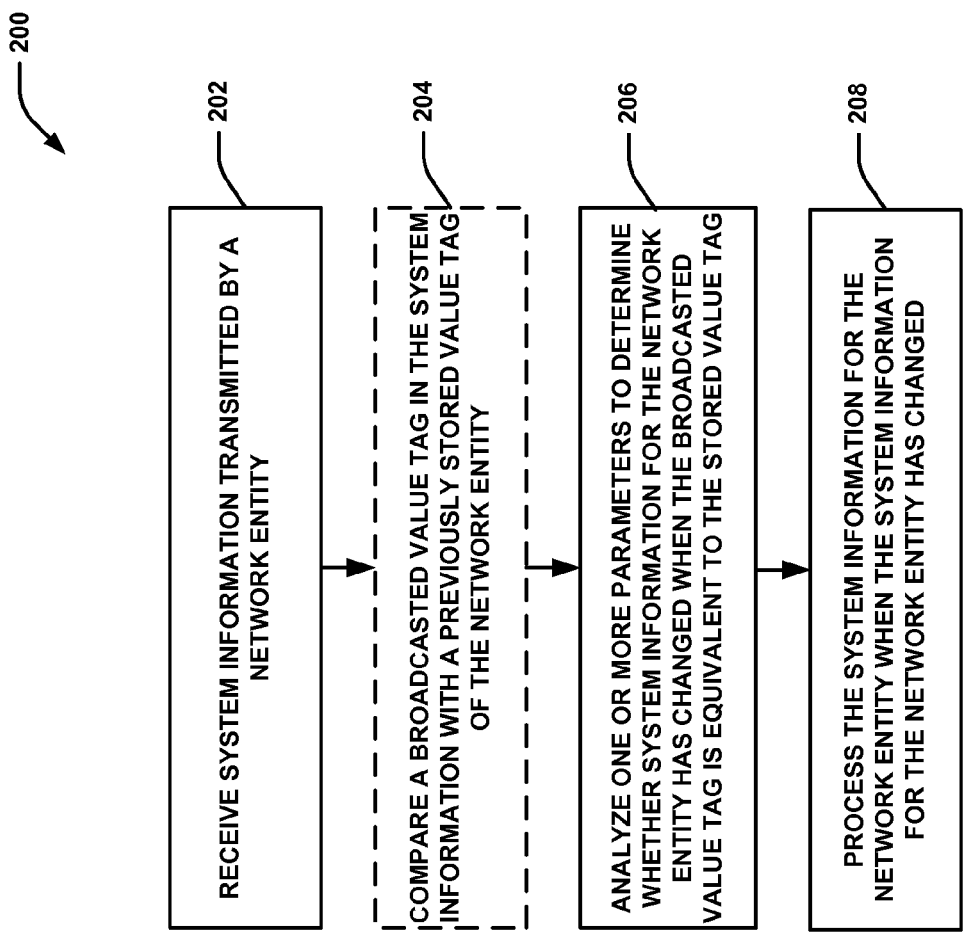
FIG. 2 is a flow diagram comprising a plurality of functional blocks representing an example methodology of processing system information.
Figure 3:
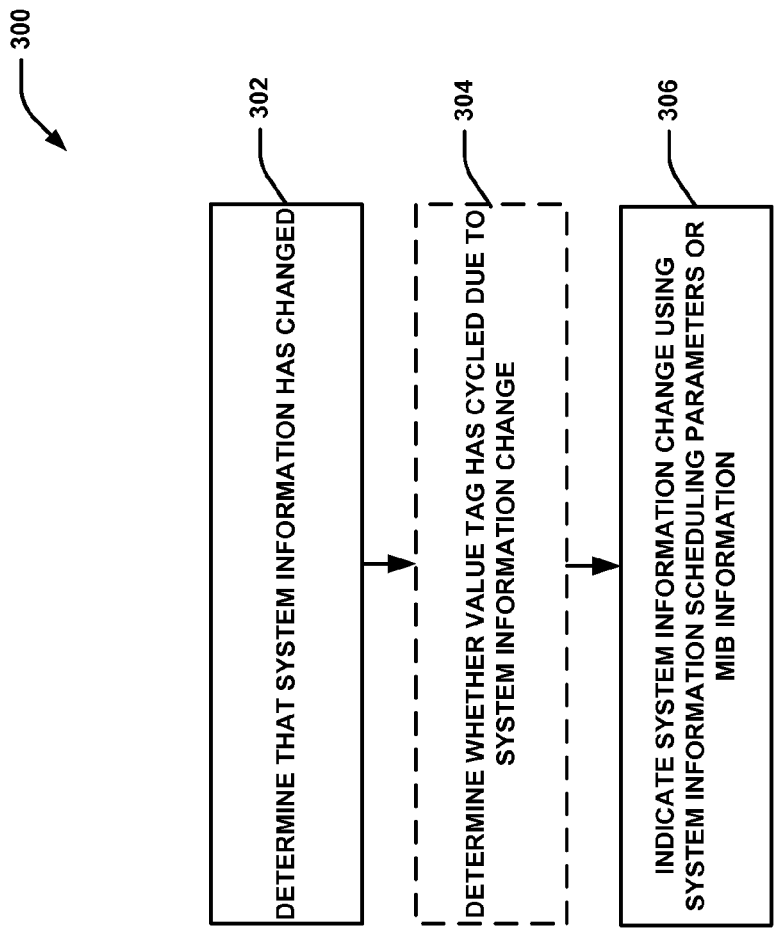
FIG. 3 is a flow diagram comprising a plurality of functional blocks representing an example methodology of indicating a change in system information.
Figure 4:
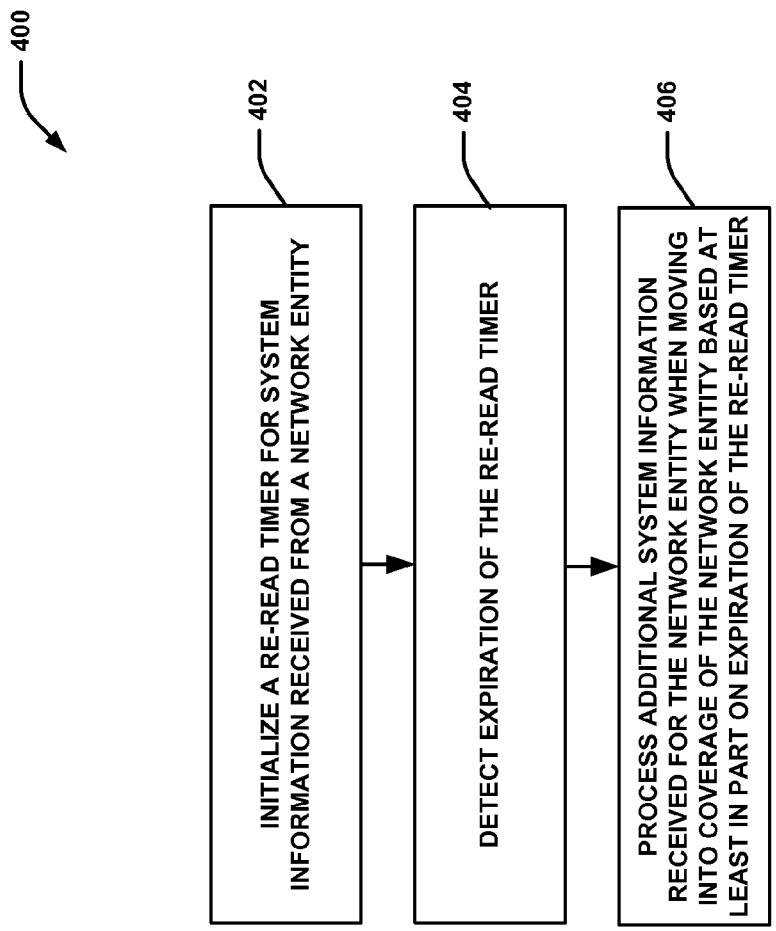
FIG. 4 is a flow diagram comprising a plurality of functional blocks representing an example methodology of processing system information based on a timer.

Referring to FIGS. 1-4, aspects are depicted with reference to one or more components and one or more methods that may perform the actions or functions described herein. Although the operations described below in FIGS. 2-4 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions. Moreover, in an aspect, a component may be one of the parts that make up a system, may be hardware or software, and/or may be divided into other components.

FIG. 2 illustrates an example method 200 for determining whether system information of a network entity has changed. It is to be appreciated that this method 200 can be performed by a UE 102 (FIG. 1) when re-entering coverage of a previous cell where the UE 102 includes a stored version of system information previously received in the cell. Method 200 includes, at Block 202, receiving system information transmitted by a network entity. UE 102 includes a SIB/MIB receiving component 106 for receiving system information transmitted by network entity 104 (e.g., system information (SI) 124), where the system information may include one or more SIBs and/or MIBs including information for requesting network access in a related cell.

Method 200 optionally includes, at Block 204, comparing a broadcasted value tag in the system information with a stored value tag of the network entity. SIB processing component 118 can compare the broadcasted value tag in the system information (e.g., SI 124) with the stored value tag of the network entity (e.g., in stored SI 122 for the network entity 104 or the related cell). For example, UE 102 can store the previous SIB including the value tag for subsequent retrieval where the value tag has not changed (and/or subject to additional considerations or parameters of the system information as described herein) in stored SI 122. If the value tag is different, the system information has changed and can be re-read (e.g., the SI 124 can be processed by SIB processing component 118 and stored by UE 102), as described, as stored SI 122. If the value tag is the same, the system information may not have changed, but it is also possible the value tag cycled through values when system information was changed and has ended up on the previous value, as described. Thus, this comparison at Block 204 may be optional as the value tag may not be an accurate representation of whether the system information has changed. In another example, however, it may still be useful to perform the comparison at Block 204 such to avoid performing one or more remaining blocks of the method 200 (e.g., Block 206) when the value tag is different.

Method 200 also includes, at Block 206, analyzing one or more parameters to determine whether system information for the network entity has changed. Parameter analyzing component 108 can analyze the one or more parameters to determine whether system information for the network entity has changed (e.g., by one or more of its optional components performing functions described below). For example, this can include analyzing one or more parameters of the system information (e.g., SI 124) or otherwise, as described herein. In another example, this can include MIB processing component 120 obtaining one or more MIB parameters to determine whether system information has changed, as described further herein. A parameter of the system information received from a network entity (e.g., in a SIB or MIB) may also be referred to herein as a system information value. In addition, determining whether system information has changed, as described further herein, may include comparing received parameters in the system information to parameters stored from previously received system information. A parameter of the system information previously received from a network entity and stored by UE 102, which may be used in the comparison, may also be referred to herein as a stored system information value.

Method 200 also includes, at Block 208, processing the system information for the network entity when the system information for the network entity has changed. SIB processing component 118 can process the system information for the network entity 104 when the system information for the network entity 104 has changed (e.g., as determined in Block 206), as described herein.

In one example, SIB size determining component 110 can obtain a size of the system information (e.g., one or more SIBs) as part of the one or more parameters analyzed by parameter analyzing component 108. This size is also referred to herein as a system information size. In one example, the size of a given SIB may be included in one or more other SIBs or one or more MIBs received from the network entity 104. Thus, in one example, SIB size determining component 110 can determine a size of the SIB based on one or more values of a MIB processed by MIB processing component 120. Where SIB size determining component 110 determines that the size has changed (e.g., as compared to a previously processed version of the SIB), SIB processing component 118 can process one or more of the SIBs transmitted by network entity 104. The size of a previously processed version of the SIB, which may be stored by the UE 102, is also referred to herein as a stored system information size.

For example, the one or more MIBs or SIBs can include scheduling information for a given SIB (e.g. a subsequent SIB) from which the SIB size can be determined. The scheduling information may include, for example a number of segments in the given SIB. Thus, in one example, SIB size determining component 110 can determine that a number of segments for the SIB, as specified in one or more prior MIBs or SIBs, is different than that stored by UE 102 for the given SIB (e.g., in a stored MIB or a stored SIB). In this case, SIB processing component 118 can determine to receive and/or process the given SIB in signaling from the network entity 104. Thus, for example, the SIB size (e.g., as represented by a number of segments) can be used to indicate whether the SIB has changed and/or can be used in conjunction with the value tag to indicate whether the value tag has completed a cycle. In the latter example, SIB size determining component 110 can determine SIB size when the SIB processing component 118 determines that the value tag indicated in one or more other SIBs or MIBs from the network entity 104 is the same as that stored for network entity 104.

In a specific example, each SIB segment can include 246 bits. When additional features become supported by the network entity 104, this can cause modification of the SIB at least to advertise the additional supported features, and the size of SIB can increase. Thus, network entity 104 can use more SIB segments (e.g., having one of a number of SIB indices known and/or identifiable by the UE 102 and/or network entity 104) in broadcasting a given SIB. Likewise, when some features become unsupported, the size of the corresponding SIB (e.g., the number of SIB segments used to broadcast the SIB) can decrease. For example, in a legacy network, SIB 5 usually has 3 segments and may utilize more segments to support a high speed random access channel (HS-RACH). When SIB size determining component 110 detects there is a change in the number of segments in the SIB, as indicated by the network entity 104 in one or more prior MIBs or SIBs, the SIB processing component 118 can determine to process the SIB even if the value tag has not changed.

In another example, network entity 104 can indicate a change in a SIB in a subsequent transmission thereof by utilizing parameters of one or more MIBs and/or SIBs (e.g., SIBs transmitted before the given SIB to which changes are indicated). FIG. 3, which is described herein in conjunction with FIGS. 1 and 2, depicts a method 300 for a network indicating modified system information in this regard. Method 300 includes, at Block 302, determining that system information has changed. SIB generating component 130 can determine the change in system information based on one or more parameters, such as determining to add new supported features for network entity 104 (which can result in modification of one or more SIBs to advertise the additional features), detecting modification in the SIBs upon generating the SIBs (e.g., based on comparing the SIBs to previously transmitted SIBs stored in memory, etc.), and/or the like. In one example, SIB generating component 130 can also increment or cycle a value tag in a SIB (e.g., SIB5 value tag) to indicate whether the SIB information has changed.

Method 300 optionally includes, at Block 304, determining whether the value tag has cycled due to a system information change. SIB change indicating component 134 may optionally determine whether the tag value has cycled due to a system information change. For example, SIB change indicating component 134 can detect whether the value tag in the SIB has cycled (e.g., from a maximum value to a minimum value) between subsequent versions of the SIB generated by SIB generating component 130. As described above, this determination can be optional as the network entity 104 may indicate SIB change using other parameters; however, SIB change indicating component 134 may determine not to additionally use the other parameters unless the value tag has cycled.

Method 300 also includes, at Block 306, indicating system information change using system information scheduling parameters or MIB information. SIB change indicating component 134 can indicate the system information change using the system information scheduling parameters or MIB information (e.g., or other parameters), which is described in example aspects below.

For example, SIB generating component 130 can employ a different scheduling of segments in a given SIB to indicate that the SIB has changed. For instance, SIB generating component 130 can modify a position or offset of one or more segments, which can be indicated in one or more MIBs or prior SIBs. In this example, SIB schedule detecting component 112 can determine a schedule parameter, such as the position or offset of the one or more segments, as specified for the given SIB in the one or more MIBs or prior SIBs (e.g., as processed by MIB processing component 120 and/or SIB processing component 118) to determine whether related system information has changed (e.g., as the one or more analyzed parameters in Block 206). A schedule parameter indicated in the one or more MIBs or prior SIBs may be referred to herein as a system information schedule parameter. If the position and/or offset specified in the one or MIBs or prior SIBs is different from that stored by the UE 102 for the given SIB of network entity 104, SIB processing component 118 can determine to process the given SIB. A schedule parameter stored in one or more prior SIBs (e.g., at the UE 102) may be referred to herein as a stored system information schedule parameter (e.g., a stored position or stored offset).

In one specific example, SIB schedule detecting component 112 can determine the SIB scheduling in conjunction with one or more of the previous examples. For instance, SIB schedule detecting component 112 can determine the SIB scheduling when SIB size determining component 110 determines the SIB size (e.g., number of segments) received in the MIBs or one or more prior SIBs is the same for the given SIB as that stored by the UE 102 in a previous version of the SIB for the network entity 104 or related cell. In an additional or alternative example, the SIB scheduling can be used to indicate whether the SIB has changed and/or can be used in conjunction with the value tag to indicate whether the value tag has completed a cycle. In the latter example, SIB schedule detecting component 112 can determine SIB schedule when the UE 102 determines that the value tag is the same as that stored for network entity 104.

In a specific example, MIB generating component 132 can include SIB scheduling information in a table of values similar to the following for receipt and processing by MIB processing component 120.

TABLE 1

Example MIB Format

| Scheduling | Mandatory present (MP) Mandatory default (MD) | | |
|---|---|---|---|
| >SEG_COUNT | MD | | Default value is 1 |
| >SIB_REP | MP | | Repetition period for the SIB in frames |
| >SIB_POS | MP | | Position of the first segment |
| >SIB_POS offset info | MD | 1 . . . 15 | |
| >>SIB_OFF | MP | | Offset of subsequent segments |

For example, if the number of segments (SEG_COUNT) is the same though the SIB has changed, the SIB change indicating component 134 can use different SIB_POS and/or SIB_OFF to indicate the SIB has changed. For example, SIB change indicating component 134 can select a next value for the SIB_POS or SIB_OFF, as identified in some MIB formats, and can accordingly reposition the SIB according to the SIB_POS or SIB_OFF. Thus, SIB schedule detecting component 112 can determine whether a different SIB_POS and/or SIB_OFF is indicated in the MIB, and SIB processing component 118 can accordingly determine whether to process one or more SIBs. As similarly described above, it is to be appreciated that SIB change indicating component 134 can indicate the change as described in conjunction with other examples (e.g., where the SIB size is the same, where the value tag is the same, etc.).

In a further example, SIB change indicating component 134 can utilize a MIB value tag to indicate that one or more SIBs have changed and/or that a value tag for one or more SIBs has cycled or rolled over (e.g., as in Block 306). In this example, when one or more SIBs are modified (e.g., when a certain SIB is modified or one of a set of SIBs are modified) or when the value tag for one or more SIBs is rolled over (e.g., a certain SIB, one of a set of SIBs, etc.), SIB change indicating component 134 can include and/or modify a value tag in a MIB. Thus, MIB analyzing component 114 can determine whether a MIB value tag received and processed by MIB processing component 120 matches a stored MIB value tag for network entity 104 (e.g., as the analyzed parameter in Block 206) to determine whether system information has changed. If the received MIB value tag is different, MIB analyzing component 114 can determine that system information has changed, and SIB processing component 118 can accordingly determine to process one or more SIBs. In one example, SIB processing component 118 may not know which SIB has changed based on the updated MIB value tag, and thus SIB processing component 118 process all SIBs generated by SIB generating component 130 and broadcasted by network entity 104 based on processing the updated MIB value tag.

In yet another example, network entity 104 can use extra bits (e.g., dummy bits) in one or more data structures to communicate that a subject SIB has changed. The data structure can be present in a MIB or a related scheduling block (SB), and thus MIB generating component 132 can create the MIB or SB to specify bits indicating that the subject SIB has changed. MIB processing component 120 can accordingly read the MIB or SB, and MIB analyzing component 114 can analyze one or more parameters of the MIB or SB to determine whether the subject SIB has changed. SIB processing component 118 can re-read the subject SIB when the bits of the MIB or SB indicate that the subject SIB has changed. It is to be appreciated that the bits used for a given SIB can be known by the MIB generating component 132 and MIB analyzing component 114 through hardware, firmware, or software configuration, specification by a network, network entity 104, UE 102, etc., negotiation between network entity 104 and UE 102, and/or the like. Thus, the MIB analyzing component 114 can check bits related to a given SIB in determining whether to re-read the SIB.

In one specific example, before SIB processing component 118 reads one or more SIBs, the MIB analyzing component 114 can first read MIB and SB that include an information element (IE) "SIBSb-TypeAndTag." In this IE, there may be a few dummy bits. Dummy bits are un-used bits in coding schemes (e.g., abstract syntax notation one (ASN.1) coding), which can be used in a radio resource control (RRC) or similar communication layer. MIB generating component 132 can use dummy bits to indicate the SIB has changed even if the value tags are identical. In one example, MIB generating component 132 generates the MIB such that the first dummy bit of SIBSb-TypeAndTag is used for SIB5. If the broadcasted value tag of SIB5 is 1, for example, and the first dummy bit has a value, this may indicate the value tag has rolled over and the UE 102 needs to re-read SIB5 even if its stored value tag is identical. Thus, MIB analyzing component 114, in this example, may read the MIB to determine if SIBSb-TypeAndTag has a value. SIBSb-TypeAndTag may have the following format:

```
SIBSb-TypeAndTag ::=    CHOICE {
    sysInfoType1        PLMN-ValueTag,
    sysInfoType2        CellValueTag,
    sysInfoType3        CellValueTag,
    sysInfoType4        CellValueTag,
    sysInfoType5        CellValueTag,
    sysInfoType6        CellValueTag,
    sysInfoType7        NULL,
    dummy               CellValueTag,
    dummy2                  NULL,
    dummy3                  NULL,
    sysInfoType11       CellValueTag,
    sysInfoType12       CellValueTag,
    sysInfoType13       CellValueTag,
    sysInfoType13-1         CellValueTag,
    sysInfoType13-2         CellValueTag,
    sysInfoType13-3         CellValueTag,
    sysInfoType13-4         CellValueTag,
    sysInfoType14       NULL,
    sysInfoType15       CellValueTag,
    sysInfoType16       PredefinedConfigIdentityAndValueTag,
    sysInfoType17       NULL,
    sysInfoTypeSB1          CellValueTag,
    sysInfoTypeSB2          CellValueTag,
    sysInfoType15-1         CellValueTag,
    sysInfoType15-2         SIBOccurrenceIdentityAndValueTag,
    sysInfoType15-3         SIBOccurrenceIdentityAndValueTag,
    sysInfoType15-4         CellValueTag,
    sysInfoType18       CellValueTag,
    sysInfoType15-5         CellValueTag,
    sysInfoType5bis         CellValueTag,
    spare2              NULL,
    spare1              NULL
}
```

Thus, the first dummy bit can indicate a CellValueTag that specifies whether SIB has changed and/or whether the corresponding CellValueTag has completed a cycle of tags. There are multiple ways to use dummy bit, and the above description is not intended to limit the usage. As a result, by using a combination of "sysInfoTypex CellValueTag" and "dummy" bits, MIB generating component 132 can generate the MIB to indicate whether the corresponding SIB has changed and/or whether the CellValueTag for the SIB has completed a cycle (and thus may be the same value as that stored by the UE 102 though the SIB has changed). Thus, MIB analyzing component 114 can analyze a MIB received by MIB processing component 120 and can determine the value of CellValueTag and/or dummy bits to determine whether one or more SIBs have changed before reading the SIBs.

In another example, dummy bits of SIB-TypeAndTag, which can be included in SIBSb-TypeAndTag, can be similarly used. For example, SIB-TypeAndTag can have a format similar to that provided below, and one or more of the dummy bits can be used to indicate whether a corresponding SIB has changed.

```
SIB-TypeAndTag ::=      CHOICE {
    sysInfoType1            PLMN-ValueTag,
    sysInfoType2            CellValueTag,
    sysInfoType3            CellValueTag,
    sysInfoType4            CellValueTag,
    sysInfoType5            CellValueTag,
    sysInfoType6            CellValueTag,
    sysInfoType7            NULL,
    dummy                   CellValueTag,
    dummy2                  NULL,
    dummy3                  NULL,
    sysInfoType11           CellValueTag,
    sysInfoType12           CellValueTag,
    sysInfoType13           CellValueTag,
    sysInfoType13-1             CellValueTag,
    sysInfoType13-2             CellValueTag,
    sysInfoType13-3             CellValueTag,
    sysInfoType13-4             CellValueTag,
    sysInfoType14           NULL,
    sysInfoType15           CellValueTag,
    sysInfoType16           PredefinedConfigIdentityAndValueTag,
    sysInfoType17           NULL,
    sysInfoType15-1             CellValueTag,
    sysInfoType15-2             SIBOccurrenceIdentityAndValueTag,
    sysInfoType15-3             SIBOccurrenceIdentityAndValueTag,
    sysInfoType15-4             CellValueTag,
    sysInfoType18           CellValueTag,
    sysInfoType15-5             CellValueTag,
    sysInfoType5bis             CellValueTag,
    spare4          NULL,
    spare3          NULL,
    spare2          NULL,
    spare1          NULL
}
```

FIG. 4, which is described in conjunction with FIG. 1, illustrates an example method 400 for processing system information based on a re-read timer initialized after reading system information from a network entity. Method 400 includes, at Block 402, initializing a re-read timer for system information received from a network entity. SIB re-read timer component 116 can initialize the re-read timer for system information received from network entity 104 based at least in part on processing the system information. In this regard, for example, SIB re-read timer component 116 may manage a timer for one or more SIBs received by one or more network entities or related cells. The timer value for initialization can be a configured re-read timer value in the UE 102 (e.g., via hardware, firmware, or software configuration of the UE 102), received in a configuration from network entity 104 or other network entities based on communicating with the wireless network (e.g., in the SIB or other communication from the network), generated by the SIB re-read timer component 116 based on observed parameters or previous timer values, and/or the like.

Method 400 also includes, at Block 404, detecting expiration of the re-read timer. SIB re-read timer component 116 can detect expiration of the re-read timer. As described, SIB re-read timer component 116 can initialize and detect expiration of multiple timers related to one or more SIBs read from a plurality of network entities or related cells. Expiration of the timer in this regard can indicate that the corresponding SIB at the corresponding network entity or related cell should be re-read upon entering coverage of the corresponding network entity or related cell.

Accordingly, method 400 also includes, at Block 406, processing additional system information received for the network entity when moving into coverage of the network entity based at least in part on expiration of the re-read timer. SIB processing component 118 can process the additional system information for network entity 104 when moving into coverage of network entity 104 based at last in part on expiration of the related re-read timer. As described, the re-read timer may relate to one or more SIBs of the network entity 104 or a related cell. Thus, SIB processing component 118 may process one or more SIBs received from the network entity 104 (e.g., as the additional system information) when UE 102 moves away from and back into coverage of network entity 104 or a related cell, where the SIB(s) relate to the expired re-read timer.

It is to be appreciated that expired re-read timers may relate to other network entities or cells. Accordingly, when entering coverage of other network entities or related cells, for example, SIB re-read timer component 116 may determine whether any SIB re-read timers have expired for the other network entities or related cells, and if so, SIB processing component 118 may re-read SIBs corresponding to expired timers for the other network entities or related cells. In addition, based on SIB processing component 118 processing the SIB, SIB re-read timer component 116 may again initialize the re-read timer for the SIB and network entity 104 or related cell. In addition, the re-read timers can be used in conjunction with the value tag, as described above, such that where the value tag broadcasted by the network entity 104 is different when the UE 102 re-enters coverage of network entity 104 or a related cell, SIB processing component 118 can re-read the SIB regardless of the re-read timer value, and in an example, the SIB re-read timer component 116 re-initializes the timer based on SIB processing component 118 re-reading the SIB regardless of the re-read timer value.

Figure 5:
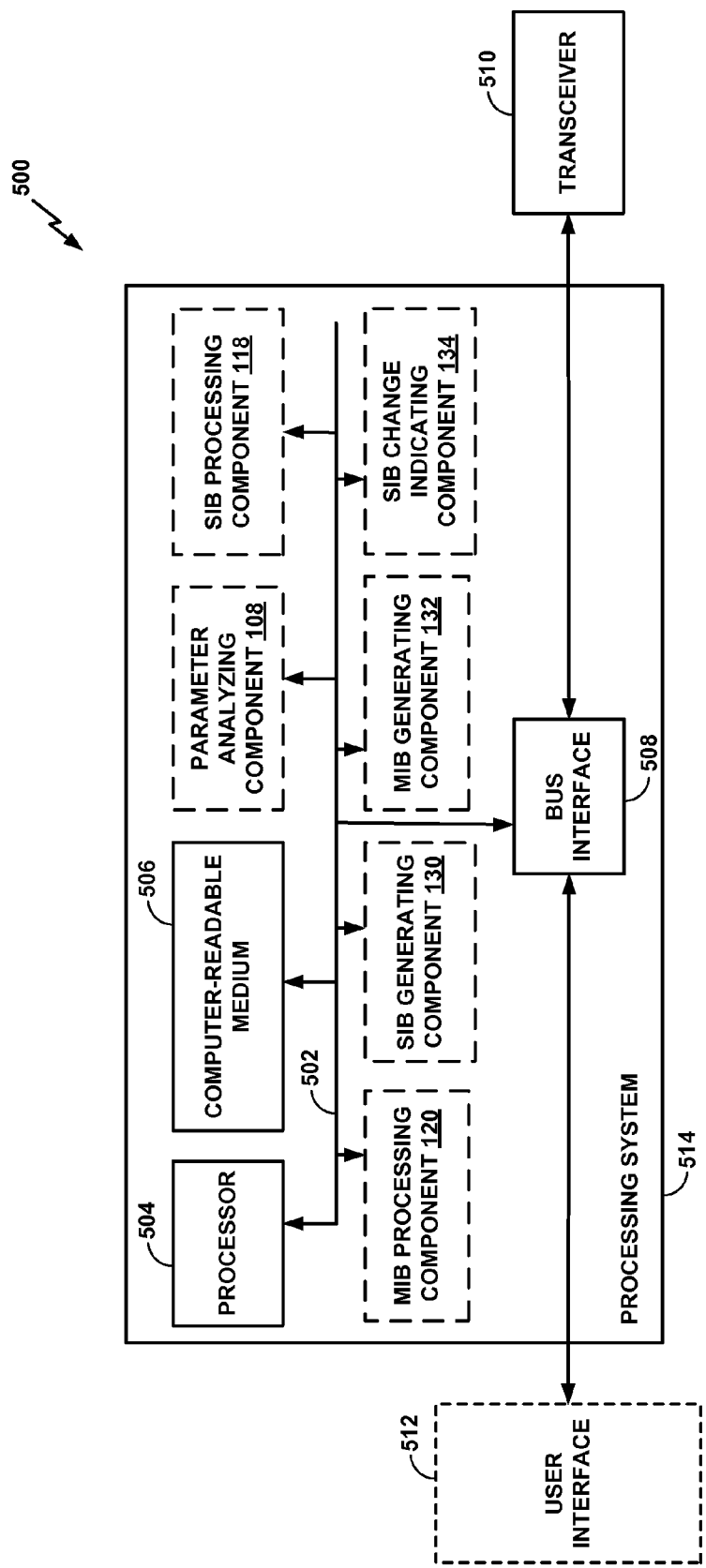
FIG. 5 is a diagram illustrating an example of a hardware implementation for an apparatus employing a processing system.

FIG. 5 is a conceptual diagram illustrating an example of a hardware implementation for an apparatus 500 employing a processing system 514. In some examples, the processing system 514 may comprise a UE or a component of a UE (e.g., UE 102 or network entity 104 of FIG. 1, etc.). In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, computer-readable media, represented generally by the computer-readable medium 506, parameter analyzing component 108, SIB processing component 118, MIB processing component 120, SIB generating component 130, MIB generating component 132, SIB change indicating component 134, etc. (see FIG. 1), which may be configured to carry out one or more methods or procedures described herein.

The bus 502 may also link various other circuits such as timing sources, peripherals, voltage regulators, and power management circuits, which are well known in the art. A bus interface 508 provides an interface between the bus 502 and a transceiver 510. The transceiver 510 provides a means for communicating with various other apparatus over a transmission medium. For example, transceiver 510 may be configured or otherwise specially programmed to perform the functionality of the SIB/MIB receiving component 106, SIB/MIB transmitting component 136, etc. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

Figure 6:
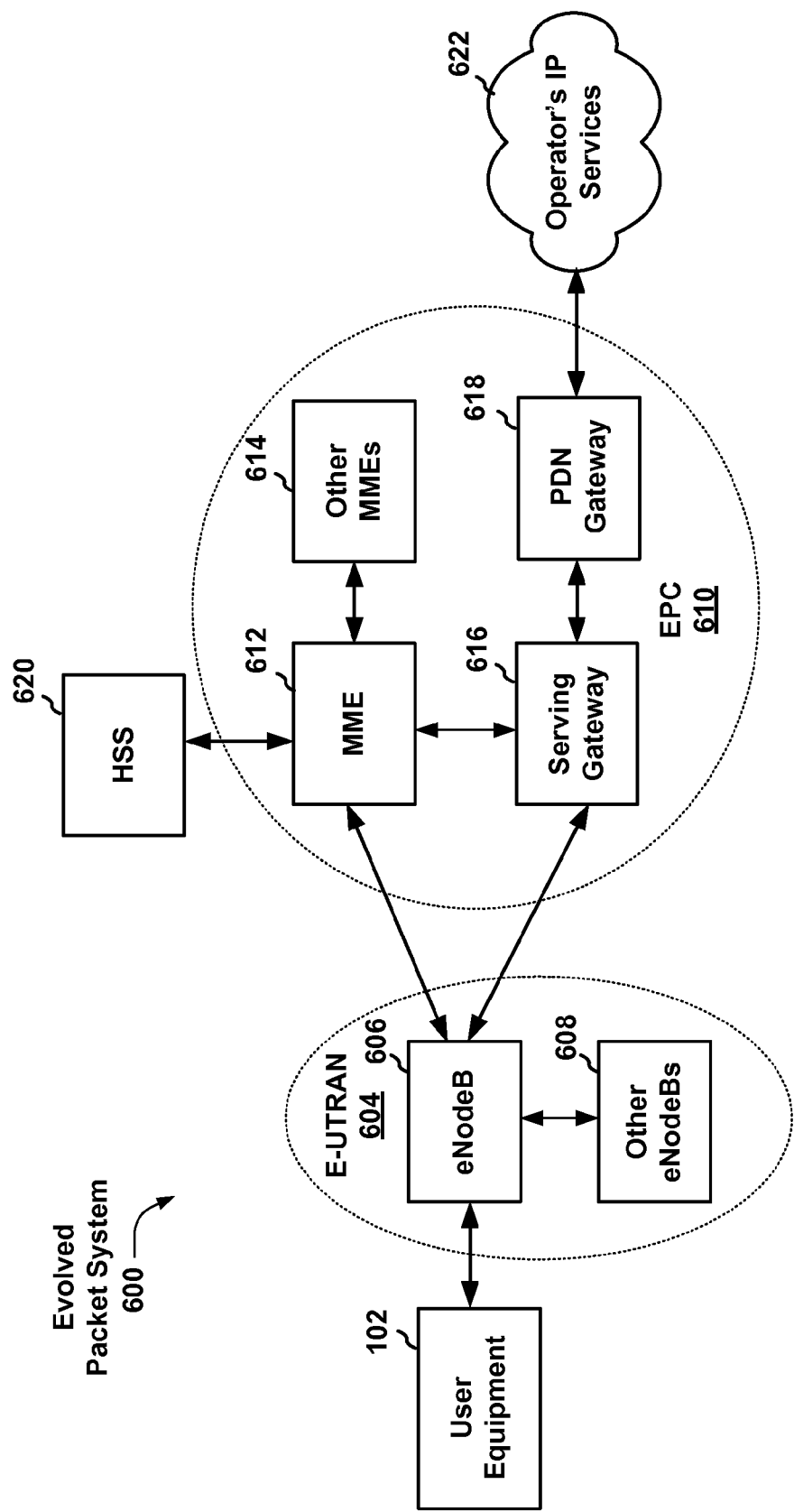
FIG. 6 is a block diagram conceptually illustrating an example of an LTE telecommunications system.

In an aspect, processor 504, computer-readable medium 506, or a combination of both may be configured or otherwise specially programmed to perform the functionality of the SIB/MIB receiving component 106, parameter analyzing component 108, SIB processing component 118, MIB processing component 120, SIB generating component 130, MIB generating component 132, SIB change indicating component 134, SIB/MIB transmitting component 136, etc., components thereof, or various other components described herein, and/or the like FIG. 6 is a diagram illustrating an LTE network architecture 600 employing various apparatuses. The LTE network architecture 600 may be referred to as an Evolved Packet System (EPS) 600. The EPS 600 may include one or more user equipment (UE) 102, an Evolved UMTS Terrestrial Radio Access Network (E-UTRAN) 604, an Evolved Packet Core (EPC) 610, a Home Subscriber Server (HSS) 620, and an Operator's IP Services 622. The EPS can interconnect with other access networks, but for simplicity those entities/interfaces are not shown. As shown, the EPS provides packet-switched services, however, as those skilled in the art will readily appreciate, the various concepts presented herein may be extended to networks providing circuit-switched services.

The E-UTRAN includes an eNB 606, which may include network entity 104, and other eNBs 608. The eNB 606 provides user and control plane protocol terminations toward the UE 102. The eNB 606 may be connected to the other eNBs 608 via an X2 interface (i.e., backhaul). The eNB 606 may also be referred to by those skilled in the art as a base station, a base transceiver station, a radio base station, a radio transceiver, a transceiver function, a basic service set (BSS), an extended service set (ESS), or some other suitable terminology. The eNB 606 provides an access point to the EPC 610 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 606 is connected by an S1 interface to the EPC 610. The EPC 610 includes a Mobility Management Entity (MME) 612, other MMEs 614, a Serving Gateway 616, and a Packet Data Network (PDN) Gateway 618. The MME 612 is the control node that processes the signaling between the UE 102 and the EPC 610. Generally, the MME 612 provides bearer and connection management. All user IP packets are transferred through the Serving Gateway 616, which itself is connected to the PDN Gateway 618. The PDN Gateway 618 provides UE IP address allocation as well as other functions. The PDN Gateway 618 is connected to the Operator's IP Services 622. The Operator's IP Services 622 include the Internet, the Intranet, an IP Multimedia Subsystem (IMS), and a PS Streaming Service (PSS).

Figure 7:
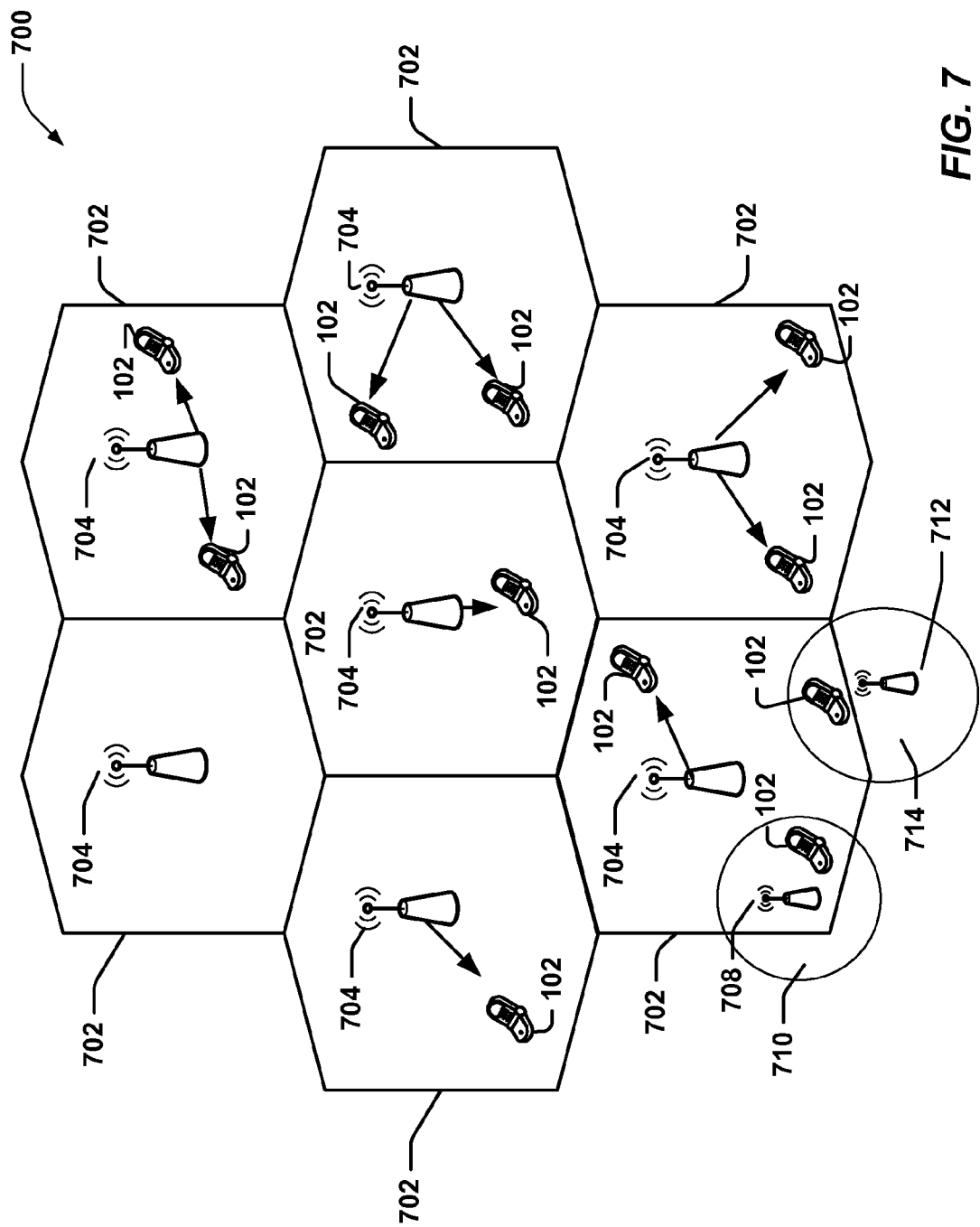
FIG. 7 is a diagram illustrating an example of an access network in an LTE network architecture.

FIG. 7 is a diagram illustrating an example of an access network in an LTE network architecture. In this example, the access network 700 is divided into a number of cellular regions (cells) 702. One or more lower power class eNBs 708, 712 may have cellular regions 710, 714, respectively, that overlap with one or more of the cells 702. The lower power class eNBs 708, 712 may be small cells (e.g., home eNBs (HeNBs)). A higher power class or macro eNB 704 is assigned to a cell 702 and is configured to provide an access point to the EPC 610 for all the UEs 102 in the cell 702. In an example, eNBs 704, 708, 712 can be a network entity 104, as described in FIG. 1. There is no centralized controller in this example of an access network 700, but a centralized controller may be used in alternative configurations. The eNB 704 is responsible for all radio related functions including radio bearer control, admission control, mobility control, scheduling, security, and connectivity to the serving gateway 616.

The modulation and multiple access scheme employed by the access network 700 may vary depending on the particular telecommunications standard being deployed. In LTE applications, orthogonal frequency-division multiplexing (OFDM) is used on the downlink (DL) and single-carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 704 may have multiple antennas supporting multiple-input, multiple output (MIMO) technology. The use of MIMO technology enables the eNB 704 to exploit the spatial domain to support spatial multiplexing, beamforming, and transmit diversity.

Spatial multiplexing may be used to transmit different streams of data simultaneously on the same frequency. The data steams may be transmitted to a single UE 102 to increase the data rate or to multiple UEs 102 to increase the overall system capacity. This is achieved by spatially precoding each data stream and then transmitting each spatially precoded stream through a different transmit antenna on the downlink. The spatially precoded data streams arrive at the UE(s) 102 with different spatial signatures, which enables each of the UE(s) 102 to recover the one or more data streams destined for that UE 102. On the uplink, each UE 102 transmits a spatially precoded data stream, which enables the eNB 704 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 8:
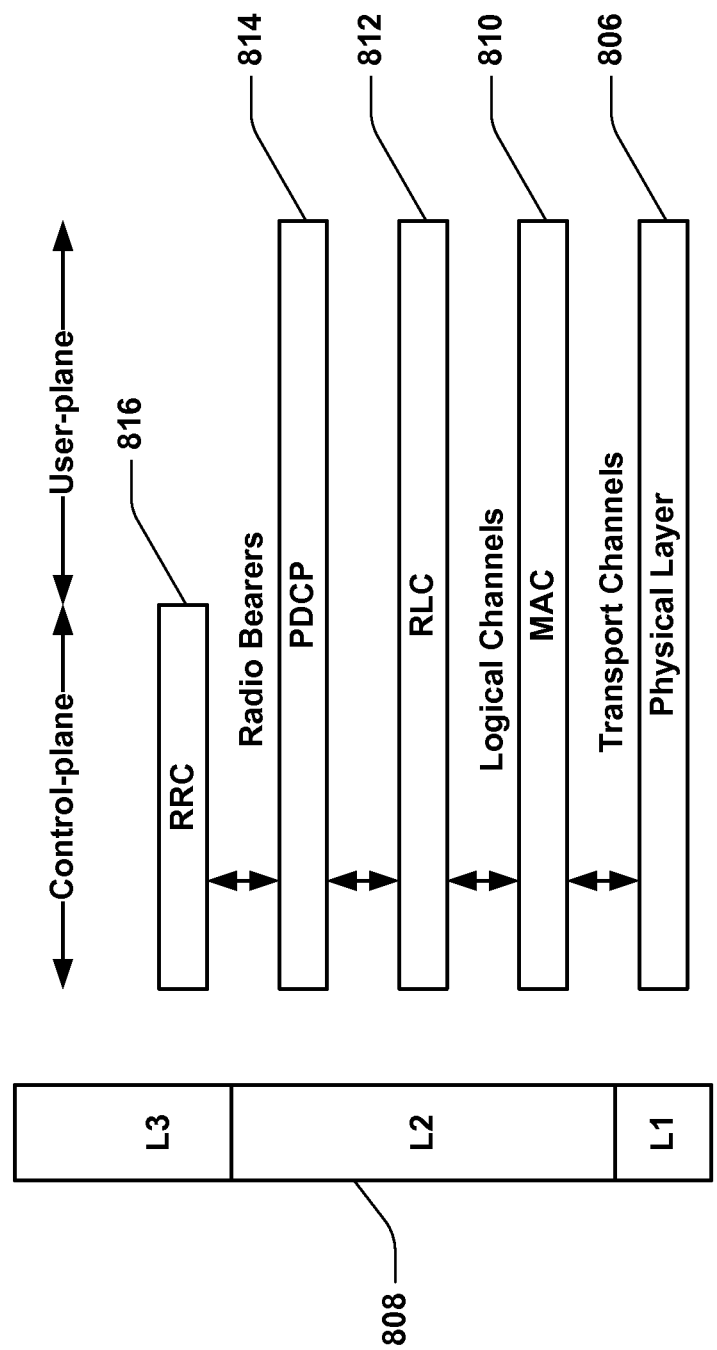
FIG. 8 is a diagram illustrating an example of a radio protocol architecture for the user and control plane.

Turning to FIG. 8, the radio protocol architecture for a UE (e.g., UE 102 of FIG. 1) and an eNB (e.g., network entity 104 of FIG. 1) is shown with three layers: Layer 1, Layer 2, and Layer 3. Layer 1 is the lowest layer and implements various physical layer signal processing functions. Layer 1 will be referred to herein as the physical layer 806. Layer 2 (L2 layer) 808 is above the physical layer 806 and is responsible for the link between the UE and eNB over the physical layer 806.

In the user plane, the L2 layer 808 includes a media access control (MAC) sublayer 810, a radio link control (RLC) sublayer 812, and a packet data convergence protocol (PDCP) 814 sublayer, which are terminated at the eNB on the network side. Although not shown, the UE may have several upper layers above the L2 layer 808 including a network layer (e.g., IP layer) that is terminated at the PDN gateway 618 (see FIG. 6) on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between eNBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

In the control plane, the radio protocol architecture for the UE and eNB is substantially the same for the physical layer 806 and the L2 layer 808 with the exception that there is no header compression function for the control plane. The control plane also includes a radio resource control (RRC) sublayer 816 in Layer 3. The RRC sublayer 816 is responsible for obtaining radio resources (i.e., radio bearers) and for configuring the lower layers using RRC signaling between the eNB and the UE.

Figure 9:
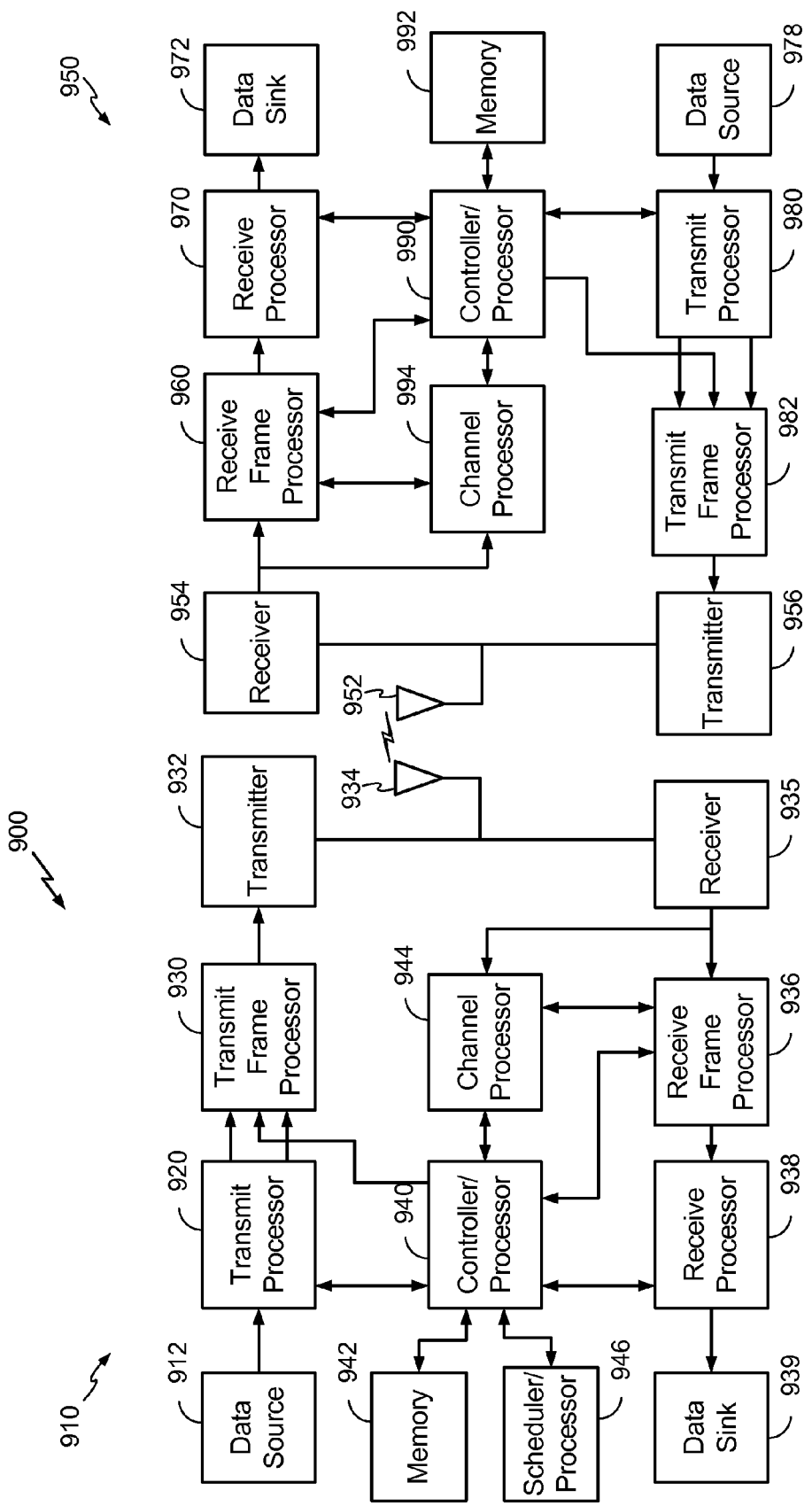
FIG. 9 is a diagram illustrating an example of an evolved Node B and user equipment in an access network.

Referring to FIG. 9, an aspect of a Node B 910 in communication with a UE 950, where the Node B 910 may network entity 104 in FIG. 1, and UE 950 may be UE 102 executing functions and/or components thereof as described in FIG. 1. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. In addition, for example, controller/processors 940 may include one or more components described of the UE 102 and/or network entity 104 in FIG. 1 and/or can perform the related functions thereof, as described herein. The computer readable media of memories 942 and 992 may store data and software for the Node B 910 and the UE 950, respectively (e.g. to perform the functions described herein with respect to UE 102, network entity 104, and/or their related components). A scheduler/processor 946 at the Node B 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects described herein may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented herein depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such is explicitly recited in the claims. No claim element is to be construed under the provisions of pre-AIA 35 U.S.C. §112, sixth paragraph, or 35 U.S.C. §112(f) unless the element is expressly recited using the phrase "means for" or, in the case of a method claim, the element is recited using the phrase "step for."

What is claimed is:

1. A method of determining whether to read system information of a network entity, comprising:
   receiving system information transmitted by a network entity;
   analyzing one or more parameters of the system information to determine whether the system information for the network entity has changed when a value tag broadcasted in the system information is equivalent to a stored value tag for the network entity; and
   processing the system information for the network entity based at least in part on determining that the system information for the network entity has changed,
   wherein the one or more parameters comprise a system information size, and wherein analyzing the one or more parameters comprises determining whether the system information has changed based on comparing the system information size to a stored system information size, from previously received system information of the network entity, to determine whether the system information size is different than the stored system information size.

2. The method of claim 1, wherein the system information size corresponds to a number of system information block (SIB) segments specified in a master information block (MIB) or a different SIB in the system information, and the stored system information size corresponds to a stored number of SIB segments in the previously received system information.

3. The method of claim 1, wherein the one or more parameters additionally comprise a system information schedule parameter broadcasted in the system information, and wherein analyzing the one or more parameters further comprises determining whether the system information has changed based on comparing the system information schedule parameter to a stored system information schedule parameter from the previously received system information of the network entity.

4. The method of claim 3, wherein the system information schedule parameter broadcasted in the system information corresponds to a position or offset of the system information, and the stored system information size corresponds to a stored position or offset of the previously received system information.

5. The method of claim 1, wherein the one or more parameters additionally comprise a value specified in a master information block (MIB) broadcasted in the system information.

6. The method of claim 5, wherein the analyzing the one or more parameters further comprises determining whether the system information has changed based on comparing a MIB value tag broadcasted in the MIB to a stored MIB value tag in a stored MIB from the previously received system information of the network entity.

7. An apparatus for determining whether to read system information of a network entity, comprising:
   a memory;
   at least one processor communicatively coupled to the memory and configured to:
   receive system information transmitted by a network entity;
   analyze one or more parameters of the system information to determine whether the system information for the network entity has changed when a value tag broadcasted in the system information is equivalent to a stored value tag for the network entity; and
   process the system information for the network entity based at least in part on determining that the system information for the network entity has changed;
   wherein the one or more parameters comprise a system information size, and wherein the at least one processor is configured to analyze the one or more parameters at least in part by determining whether the system information has changed based on comparing the system information size to a stored system information size, from previously received system information of the network entity, to determine whether the system information size is different than the stored system information size.

8. The apparatus of claim 7, wherein the system information size corresponds to a number of system information block (SIB) segments specified in a master information block (MIB) or a different SIB in the system information, and the stored system information size corresponds to a stored number of SIB segments in the previously received system information.

9. The apparatus of claim 7, wherein the one or more parameters additionally comprise a system information schedule parameter broadcasted in the system information, and wherein the at least one processor is configured to determine whether the system information has changed based on comparing the system information schedule parameter to a stored system information schedule parameter from the previously received system information of the network entity.

10. The apparatus of claim 9, wherein the system information schedule parameter broadcasted in the system information corresponds to a position or offset of the system information, and the stored system information size corresponds to a stored position or offset of the previously received system information.

11. The apparatus of claim 7, wherein the one or more parameters additionally comprise a value specified in a master information block (MIB) broadcasted in the system information.

12. The apparatus of claim 11, wherein the at least one processor is configured to determine whether the system information has changed based on comparing a MIB value tag broadcasted in the MIB to a stored MIB value tag in a stored MIB from the previously received system information of the network entity.

13. An apparatus for determining whether to read system information of a network entity, comprising:
  means for receiving system information transmitted by a network entity;
  means for analyzing one or more parameters of the system information to determine whether the system information for the network entity has changed when a value tag broadcasted in the system information is equivalent to a stored value tag for the network entity; and
  means for processing the system information for the network entity based at least in part on determining that the system information for the network entity has changed,
  wherein the one or more parameters comprise a system information size, and wherein the means for analyzing analyzes the one or more parameters at least in part by determining whether the system information has changed based on comparing the system information size to a stored system information size, from previously received system information of the network entity, to determine whether the system information size is different than the stored system information size.

14. The apparatus of claim 13, wherein the system information size corresponds to a number of system information block (SIB) segments specified in a master information block (MIB) or a different SIB in the system information, and the stored system information size corresponds to a stored number of SIB segments in the previously received system information.

15. The apparatus of claim 13, wherein the one or more parameters additionally comprise a system information schedule parameter broadcasted in the system information, and wherein the means for analyzing analyzes the one or more parameters at least in part by determining whether the system information has changed based on comparing the system information schedule parameter to a stored system information schedule parameter from the previously received system information of the network entity.

16. The apparatus of claim 15, wherein the system information schedule parameter broadcasted in the system information corresponds to a position or offset of the system information, and the stored system information size corresponds to a stored position or offset of the previously received system information.

17. The apparatus of claim 13, wherein the one or more parameters additionally comprise a value specified in a master information block (MIB) broadcasted in the system information.

18. The apparatus of claim 17, wherein the means for analyzing analyzes the one or more parameters at least in part by determining whether the system information has changed based on comparing a MIB value tag broadcasted in the MIB to a stored MIB value tag in a stored MIB from the previously received system information of the network entity.

19. A non-transitory computer-readable medium comprising code exectuable for determining whether to read system information of a network entity, the code comprising:
  code for receiving system information transmitted by a network entity;
  code for analyzing one or more parameters of the system information to determine whether the system information for the network entity has changed when a value tag broadcasted in the system information is equivalent to a stored value tag for the network entity; and
  code for processing the system information for the network entity based at least in part on determining that the system information for the network entity has changed,
  wherein the one or more parameters comprise a system information size, and wherein the code for analyzing analyzes the one or more parameters at least in part by determining whether the system information has changed based on comparing the system information size to a stored system information size, from previously received system information of the network entity, to determine whether the system information size is different than the stored system information size.

20. The non-transitory computer-readable medium of claim 19, wherein the system information size corresponds to a number of system information block (SIB) segments specified in a master information block (MIB) or a different SIB in the system information, and the stored system information size corresponds to a stored number of SIB segments in the previously received system information.

21. The non-transitory computer-readable medium of claim 19, wherein the one or more parameters additionally comprise a system information schedule parameter broadcasted in the system information, and wherein the code for analyzing analyzes the one or more parameters at least in part by determining whether the system information has changed based on comparing the system information schedule parameter to a stored system information schedule parameter from the previously received system information of the network entity.

22. The non-transitory computer-readable medium of claim 21, wherein the system information schedule parameter broadcasted in the system information corresponds to a position or offset of the system information, and the stored system information size corresponds to a stored position or offset of the previously received system information.

23. The non-transitory computer-readable medium of claim 19, wherein the one or more parameters additionally comprise a value specified in a master information block (MIB) broadcasted in the system information.

24. The non-transitory computer-readable medium of claim 23, wherein the code for analyzing analyzes the one or more parameters at least in part by determining whether the system information has changed based on comparing a MIB value tag broadcasted in the MIB to a stored MIB value tag in a stored MIB from the previously received system information of the network entity.

* * * * *